June 1, 1965   K. J. KALLENBERG   3,186,654
MAGAZINE FOR PHOTOGRAPHIC PRINTER MACHINE
Original Filed March 10, 1959   10 Sheets-Sheet 1

INVENTOR
KARL J. KALLENBERG
BY
Caswell, Lapard & Nicks
ATTORNEYS

June 1, 1965  K. J. KALLENBERG  3,186,654
MAGAZINE FOR PHOTOGRAPHIC PRINTER MACHINE
Original Filed March 10, 1959  10 Sheets-Sheet 4

INVENTOR
KARL J. KALLENBERG
BY
Caswell, Lagaard & Wicks
ATTORNEYS

INVENTOR
KARL J. KALLENBERG
BY
Caswell, Lagaard & Wicks
ATTORNEYS

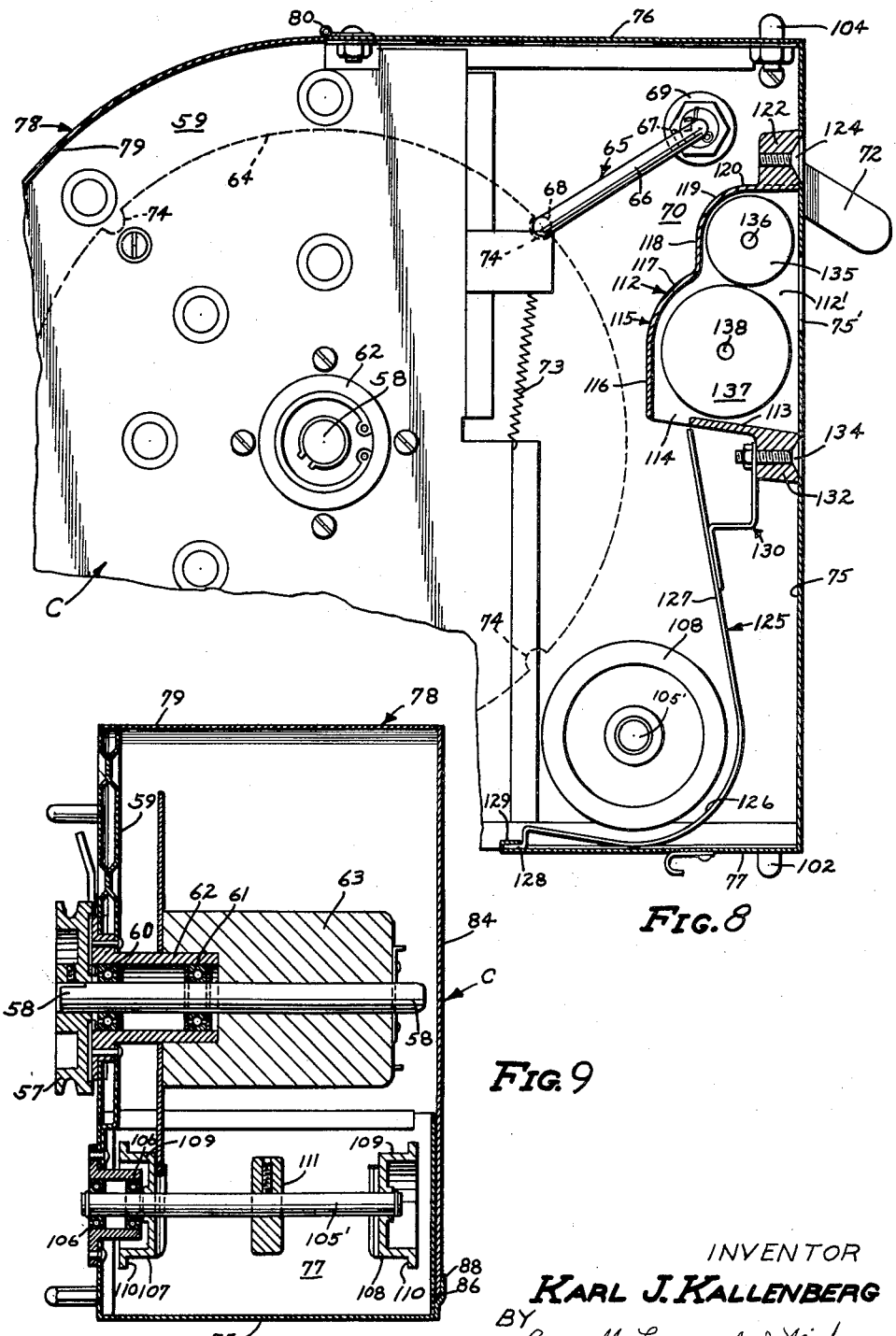

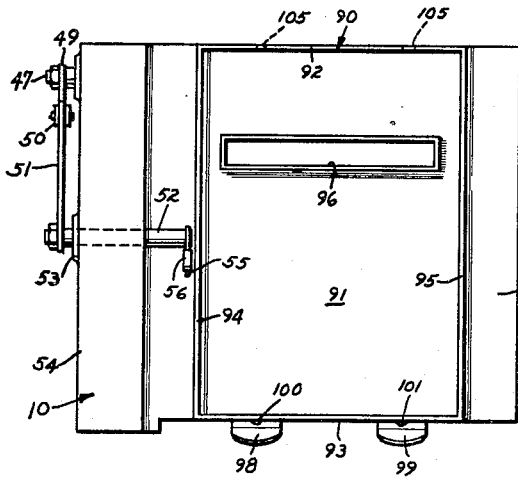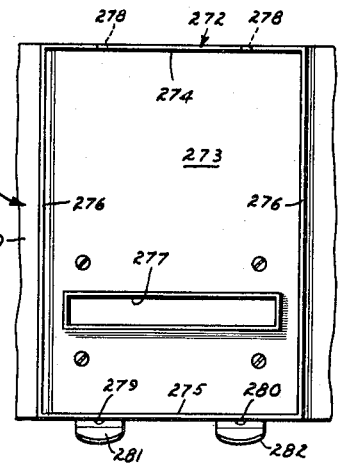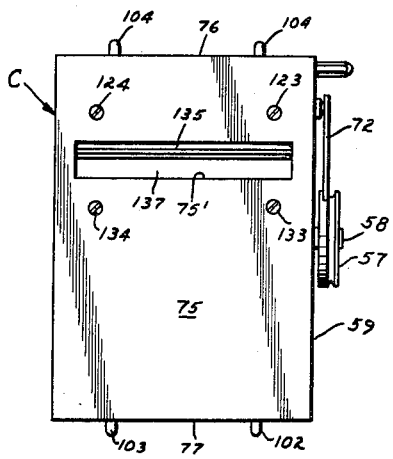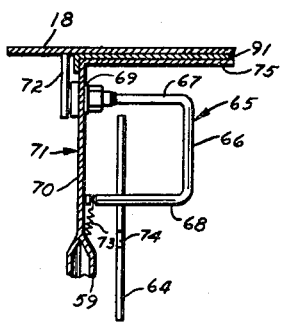

INVENTOR.
KARL J. KALLENBERG
BY
Caswell, Lagaard & Hicks
ATTORNEYS

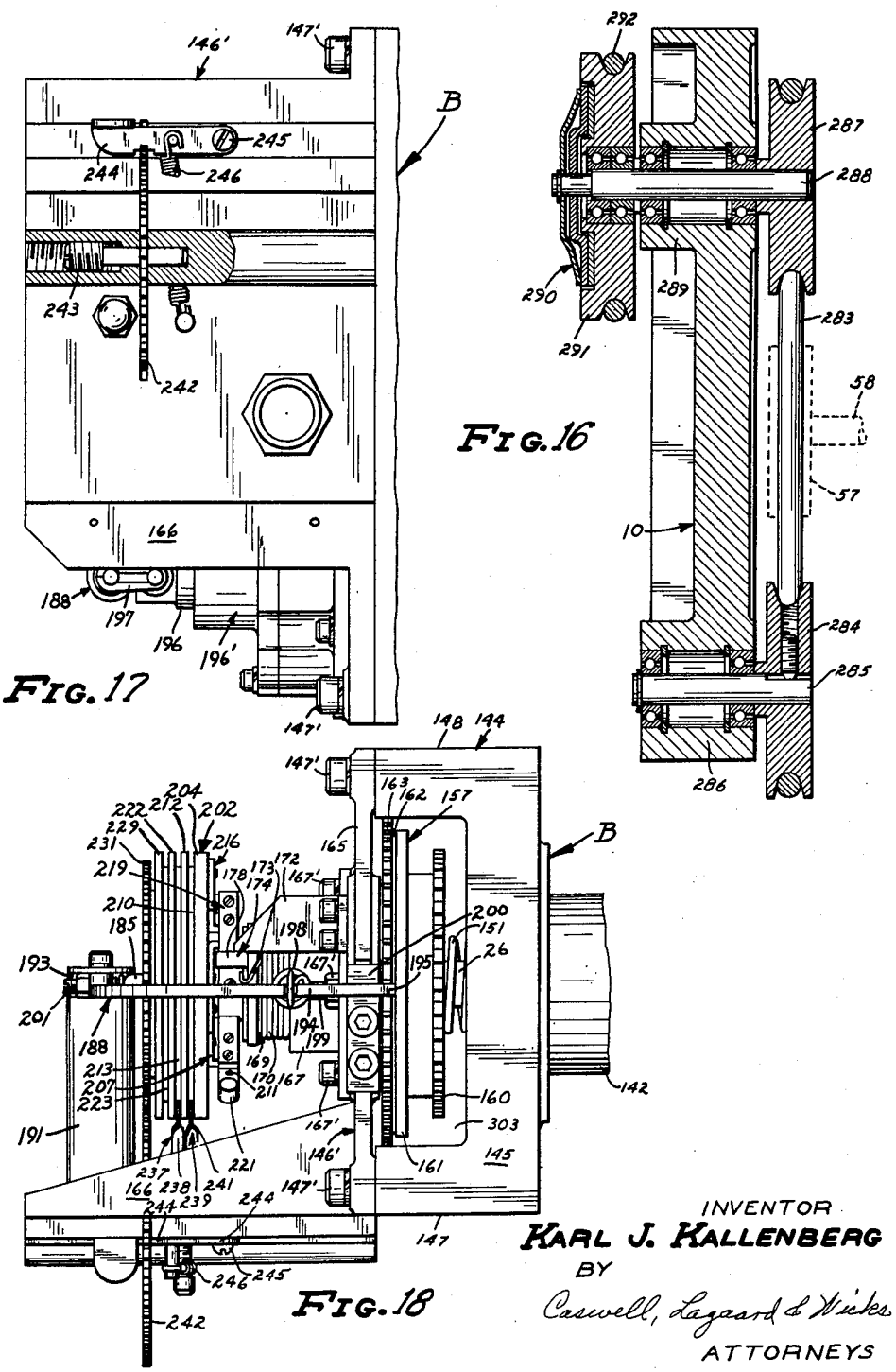

United States Patent Office 3,186,654
Patented June 1, 1965

3,186,654
MAGAZINE FOR PHOTOGRAPHIC PRINTER
MACHINE
Karl J. Kallenberg, Minneapolis, Minn., assignor to
Pako Corporation, Minneapolis, Minn.
Original application Mar. 10, 1959, Ser. No. 798,503, now
Patent No. 3,113,498, dated Dec. 10, 1963. Divided
and this application Jan. 16, 1963, Ser. No. 251,791
4 Claims. (Cl. 242—55.11)

This is a divisional application of application Serial No. 798,503, filed March 10, 1959 and issued into Patent No. 3,113,498.

The invention relates broadly to an improvement in the field of photography and more particularly to magazine housings for the print paper supply roll and print paper take-up roll used with a photographic printer machine.

It is an object of the invention to provide removable magazine means for interchangeable use with either the paper supply roll or the take-up roll in connection with the printer unit. It is also an object to provide a magazine having means for prohibiting movement of the roll of paper within the magazine when the magazine is removed from the printer unit. It is a still further object to provide a magazine having means for braking the supply roll of paper at the time when paper is not being drawn off the same.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

FIGURE 8 is a vertical section through the paper supply roll magazine with some parts broken away and some parts removed.

FIGURE 9 is a sectional view on the line 9—9 of FIGURE 6.

FIGURE 10 is a top plan view of the lock member for the paper spool only a portion of the casing and paper magazine being shown, some parts being in section and some parts removed.

FIGURE 11 is an end elevational view of the casing with the supply magazine removed, some parts being removed.

FIGURE 12 is an end elevational view of the end of the supply magazine which is positioned against the end of the casing.

FIGURE 16 is a sectional view on the line 16—16 of FIGURE 4 showing the slip clutch and drive means for the paper take-up roll.

FIGURE 17 is a side elevational view of the drive unit from the left looking at the front of the printer, some parts broken away.

FIGURE 18 is a top plan view of the drive unit.

FIGURE 19 is a fragmentary vertical sectional view on the line 19—19 of FIGURE 2, some parts in section.

FIGURE 21 is an end elevational view of the casing, the paper take-up magazine removed and some parts removed and others broken away.

FIGURE 22 is a fragmentary sectional view substantially on the line 22—22 of FIGURE 3, some parts removed.

FIGURE 23 is a perspective view of the adjustable removable paper guide flange of the paper drive shaft.

Figure 1:
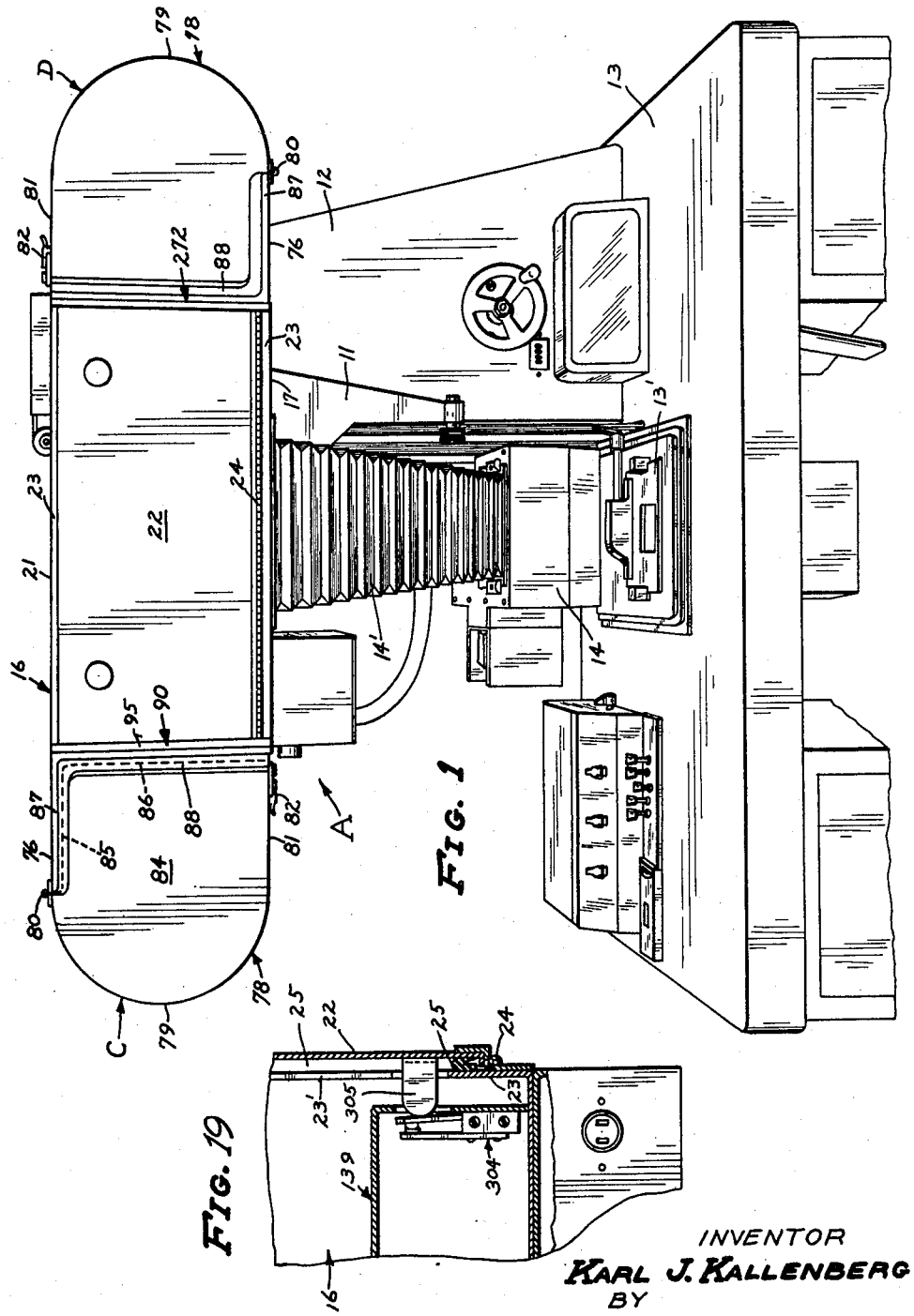
FIGURE 1 is a front elevational view of my photographic printer machine.

Referring to the drawings in detail, and particularly to FIGURES 1–5, 7–17, and 30, my photographic printer machine A includes in this application the substantially rectangular vertically disposed back support wall casting 10 which is secured to the upper end of the vertical support 11, FIGURE 1. The vertical support 11 is vertically movable on the column 12 mounted on the base 13. The column 12 also slidably mounts the lens deck housing 14 which houses the analyser unit, lens and shutter arrangement not shown here. The details of the support 11, the column 12, the lens deck housing 14 and the movement thereof relative to the base 13 are set forth in other applications on file, the construction of which is not necessary here.

Figure 4:
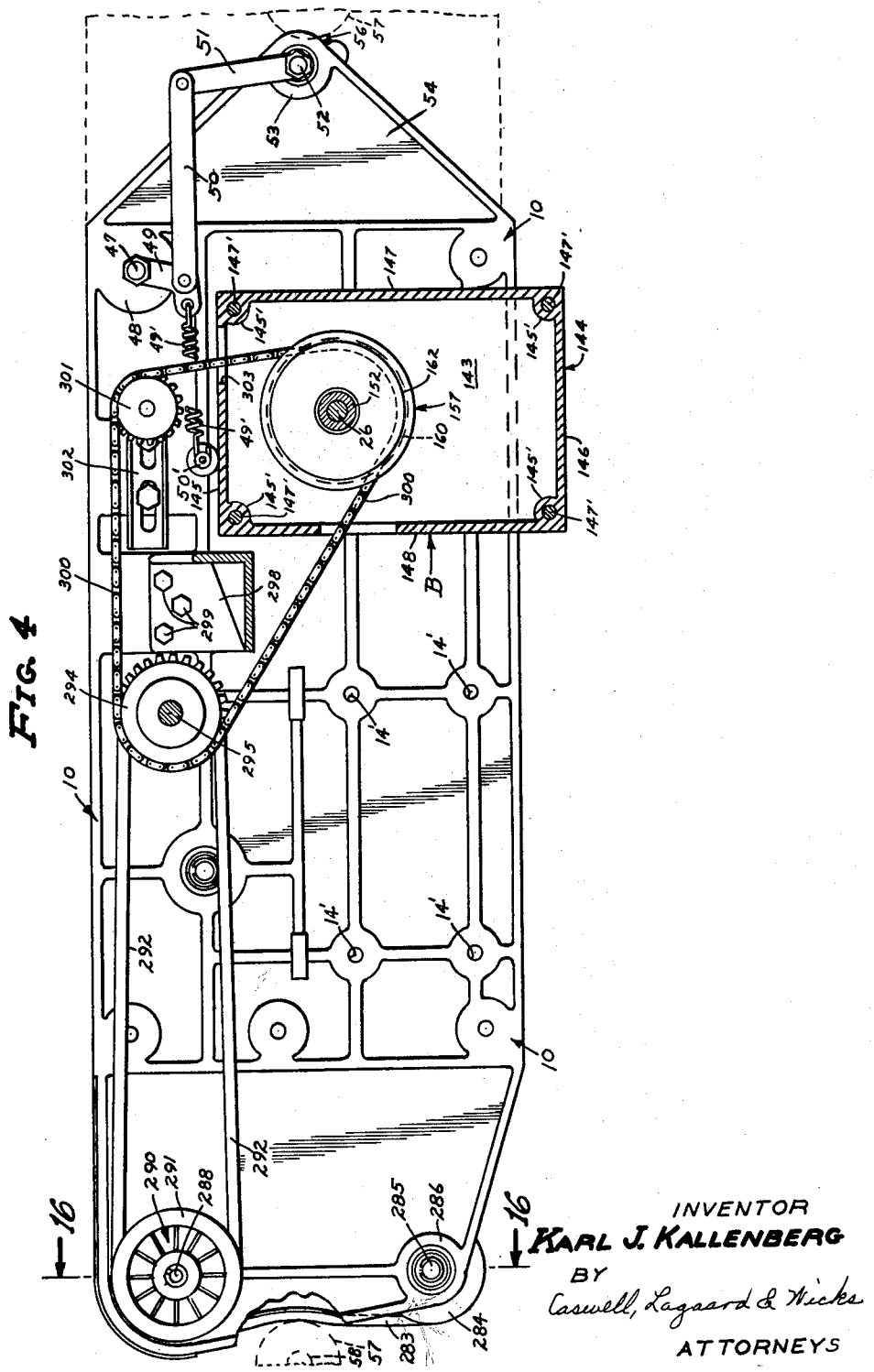
FIGURE 4 is a longitudinal rear view on the line 4—4 of FIGURE 3 some parts in section and other parts removed.

The support wall 10 is secured to the vertical support 11 by means of bolts extending through the spaced holes 14', FIGURE 4, and threadedly engaging a portion of the support 11 now shown. Secured to the wall support 10 by means of a series of bolts such as 15 is the casing 16. The casing 16 and its component parts together with the paper supply and take-up magazine hereinafter described is generally referred to as the "paper deck" with which we are primarily concerned here. The casing 16 includes the bottom 17, the end wall 18, the end wall 19, back wall 20 mounted up against the support wall 10 and secured thereto as above. The casing 16 also includes the top 21 and the front door portion 22 hingedly connected at its lower edge to the narrow front wall 23 at its lower edge by means of the hinge 24. The narrow front wall 23 borders the bottom 17, the end walls 18 and 19 and the top 21 thereby providing a large opening 23' for access into the casing from the front. The front door 22 makes a light exclusion seal with the narrow peripheral front wall 23 by means of the gasket 25 monted on the inner periphery of the front wall 23 which contacts the inner flat surface of the door 22 when the same is closed.

Rotatably mounted on the back support wall 10 and extending inwardly into the casing 16 is the drive shaft 26 which is driven by the drive assembly B hereinafter described. The shaft 26 has mounted thereon the sleeve or flange support 27, and formed in the sleeve are a series of opposed slots 28 the inner bottom surfaces of which are parallelly disposed. The slots 28 receive the parallelly disposed and spaced edges 29 and 30 of the flat circular flanges 31. A flange 31 is further formed with the circular opening 32 into which the slot 29' formed by the edges 29 and 30 enters, and the diameter of the opening 32 is slightly greater than the diameter of the sleeve 27. Further provided on the flange 31 are the arcuate spring arms 33 and 34 held by the rivet 33'. There are two flanges 31 provided which are spaced on the sleeve 27 by means of the slots 28 a distance slightly greater than the width of the print paper being run through the casing for exposure. A flange 31 is positioned in any of the opposed slots 28 by slipping the sleeve 27 into the opening 32 and then sliding the edges 29 and 30 into engagement with the slots 28. As this is done the spring arms 33 and 34 engage the sleeve 27 thereby securely but removably positioning the flanges 31 on the sleeve 27 of the shaft 26.

The numeral 35 designates a rubber paper feed roller which is mounted substantially centrally on the shaft 26. Further provided is the rubber pressure guide roller 36 positioned below the feed roller 35 and rotatably mounted on a pair of arms 37, FIGURES 2 and 5, which are pivotally mounted on the pin 38 secured to the bracket 39. Depending from each of the arms 37 is a short arm 40 and connecting the lower ends of the short arms 40 is the pin 41. A coil spring 42 is connected to the pin 41 and the upstanding bracket 43 thereby urging the pressure roller 36 upwardly against the feed roller 35 whereby strip print paper designated as X may be fed by the roller 35 as hereinafter described.

The numeral 44 designates a paper advance roller, FIGURES 2, 3, 4, 5 and 6 which is freely rotatable on the shaft 45 mounted on the outer end of the arm 46. The inner end of the arm 46 is connected to a short shaft 47 which is journaled in the enlarged portion 48 of the back support casting 10 and extends outwardly therefrom. The upward and fully retracted movement of the arm 46 is limited by the stop shoulder 46' secured to the casing. The outer end of the shaft 47 has connected thereto the short substantially L-shaped arm 49, and pivotally connected at its inner end to the short arm 49 is the substantially horizontal intermediate arm 50. Pivotally connected to the outer end of the arm 50 is the outer end of the outer arm 51. The inner or lower end of the arm 51 is fixedly secured to the outer end of the brake shaft 52 which is rotatably mounted in the enlarged portion 53 of the extended end portion 54 of the back support wall casting 10. Secured to the inner end of the brake shaft 52 is the short brake shoe arm 55 and mounted on said arm 55 is the brake shoe or foot member 56 which is engageable with the outer edge of the pulley 57 mounted on the rear side wall of the magazine C, mounted on one end of the casing 16 and housing the supply roll of print paper. The arms 49 and 50 are urged towards the center of the casing 16 by means of the coil spring 49' secured to the lower end of the arm 49 and the spring mount 50', the arm 49 pivotally connected to the arm 50 as hereinbefore set forth. With the arms 49 and 50 so urged the paper advance roller 44 is held in a raised position as in FIGURE 2 and the brake shoe 56 is against the pulley 57 braking the same. A second magazine D is mounted on the opposite end of the casing 16 wherein the exposed print paper is taken up, and it is to be noted that both magazines are identical and interchangeable as will be pointed out more particularly hereinafter. The pulley 57 is mounted on the outer end of the shaft 58 rotatably mounted on the double wall 59 portion of the magazine C by means of the bearings 60 and 61 mounted in the housing 62, particularly in FIGURE 9. A print paper supply spool 63 is secured to the shaft 58, and secured to the inner end of the spool 63 and concentrically therewith is the circular spool lock 64, FIGURES 6 and 9, and shown in broken line in FIGURE 8.

I provide means for locking the circular spool lock 64 in a non-rotative position automatically within the magazine when the magazine C is removed from the casing 16 and thereby prohibit the spool 63 from rotating. This is also true with regard to the magazine D. As a result print paper wound on the spool 63 will not be unwound from the spool. The locking means for the spool 63 includes a U-shaped lock member 65, FIGURES 7, 8 and 11 particularly, formed of the base portion 66 and the spaced leg portions 67 and 68 extending therefrom. The leg portion 67 of the lock is pivotally mounted in the bearing member 69 connected to the wall portion 70 of the magazine C, the wall portion 70 being connected to the double wall portion 59, the two wall portions 70 and 59 making up the rear stationary side wall 71 of the magazine C.

The outer free end of the leg portion 67 has connected thereto the arm 72 which lies along side the stationary wall 71 of the magazine C. Also provided is the coil spring 73 which is connected at one end to the outer free end of the leg portion 68 of the lock member 65, the other end of the spring 73 being connected to the side wall 71 of the magazine. With the spring so connected the same urges the leg portion 68 downwardly, but with the arm 72 bearing against the end wall 18 of the casing 16 when the magazine is in the attached position shown in FIGURE 1, the arm 68 of the lock 65 cannot move downwardly to the edge of the circular spool lock beyond the position shown in FIGURES 2 and 7. The circular disc lock member 64 has formed on the edge thereof the notches 74. When the magazine C is lifted slightly for removal from the casing 16, as hereinafter set forth in detail, the arm 72, moves to the position shown in FIGURE 8 by means of the spring 73 for the resistance in the form of the wall 18 has been removed. As a further result, the leg portion 68 is pulled downwardly and contacts the outer edge of the disc lock 64 and into one of the notches 74 formed in the edge thereof, FIGURES 7 and 8. Due to the spring 73 the leg portion 68 of the lock member 65 is maintained in one of the notches 74, and as a result the spool 63 will not rotate within the magazine C and allow the paper thereon to become unrolled.

When the magazine C is attached to the casing 16, in the detailed manner hereinafter set forth, the arm 72 is pivoted and forced against the wall 18 of the casing and in pivoting the leg portion 68 of the lock member 65 is lifted out of the notch 74 of the disc 64 thereby removing the locking means from the spool allowing the disc 64 and spool 63 connected thereto to rotate when the brake 56 is removed.

The magazine C includes the stationary rear side wall 71 to which is connected the inner end wall 75. The end wall 75 is formed with the paper aperture 75'. Also magazine C includes the partial top wall 76, the partial bottom wall 77, and the hingedly mounted movable cover member 78. The cover member 78 includes the arcuate end portion 79 the upper edge of which when viewing the same in closed position, is hinged to the outer edge of the partial top wall 76 by means of the hinge 80. The lower end of the arcuate end portion terminates in the flat portion 81 on which is mounted the fastener portion 82. The cover further includes the partial arcuate side wall portion 83 connected to the edge of the arcuate end portion 79 and secured to the opposite edge is the wall portion 84 formed with the top edge 85 and the vertical edge 86 when viewed in closed position, FIGURE 1. The edge portion 85 positions neatly behind the partial top wall portion 87 when the cover 78 is closed, as in FIGURE 1, and the edge portion 86 positions behind the partial vertical wall 88 of the magazine C. The wall portion 88 joins the wall portion 87 with the former depending from the partial top wall 76 and the latter extending outwardly from the inner wall 89 of the magzine C, the inner end wall 75 being removably mounted adjacent the end 18 of the casing 16 when the magazine is in operative position.

Figure 5:
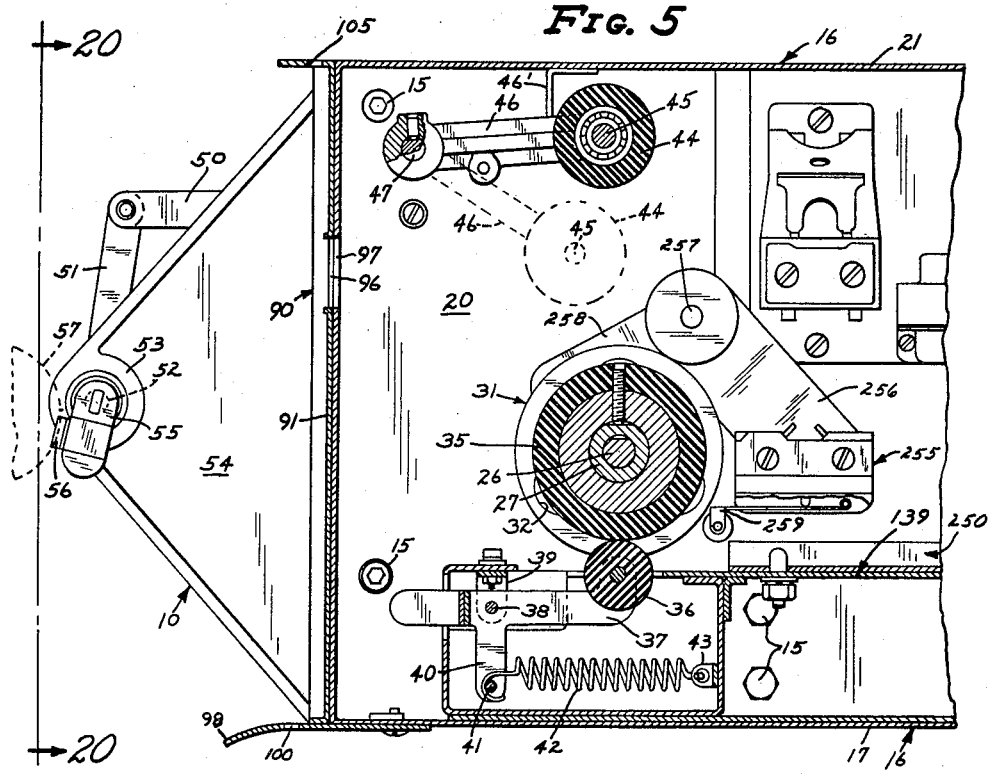
FIGURE 5 is a detailed sectional view on the line 5—5 of FIGURE 3, some parts removed.
Figure 6:
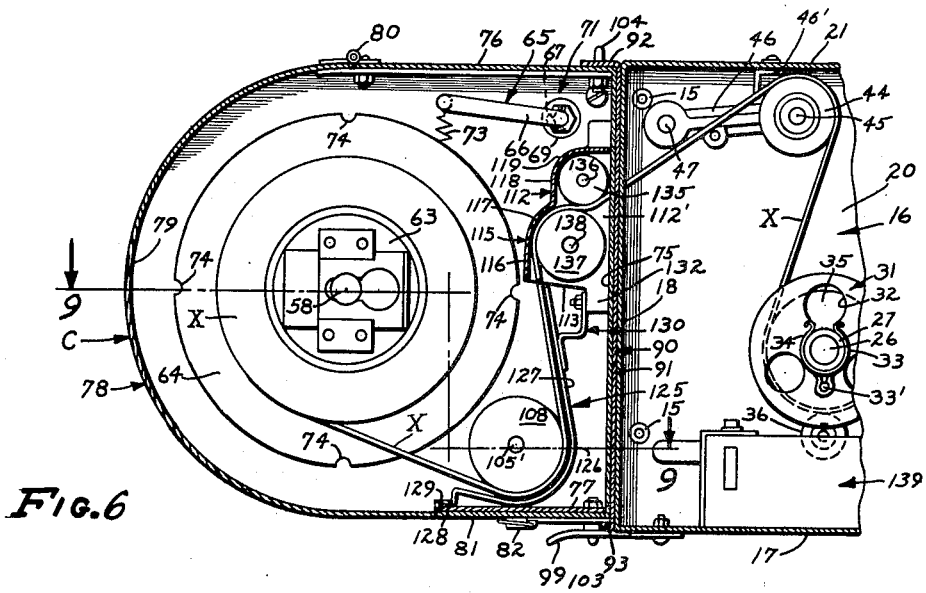
FIGURE 6 is a front side view of the paper supply roll magazine in closed position and a portion of the casing, some parts in section and some parts removed.
Figure 7:
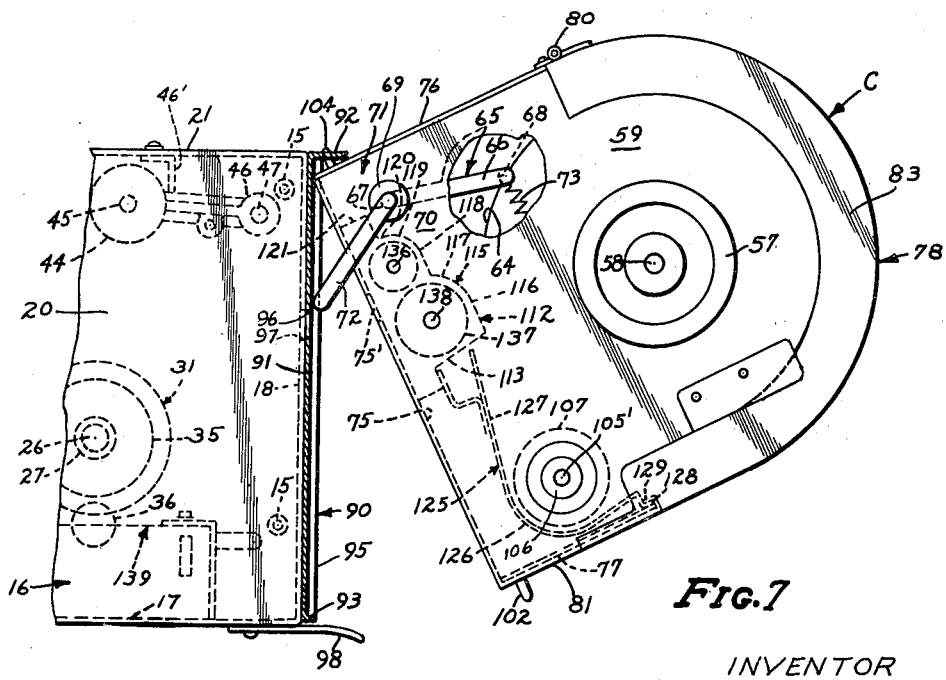
FIGURE 7 is a rear side view of the magazine shown in FIGURE 7 with the magazine partially open to illustrate the means for locking the supply roll within the magazine.
Figure 13:
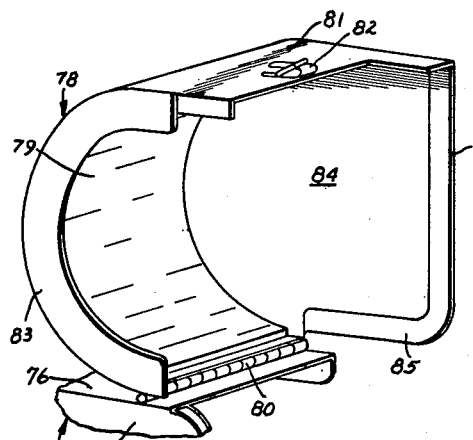
FIGURE 13 is a perspective view of the magazine cover in open raised position.

Secured to the end wall 18 of the casing 16 is the magazine receiver plate 90, FIGURES 5 and 11 in particular, which is formed of the flat base plate portion 91, and a peripheral plate wall including the upper wall 92, the side wall 94 and the opposed side wall 95. The base portion 91 has the paper receiving aperture 96 formed therein which is in alignment with a similar aperture 97 formed in the end wall 18.

The numerals 98 and 99 designate a pair of identical spring tongues secured to the underside 17 of the casing 16 in spaced relation and extending outwardly of the plate 90 and each has formed therein the holes 100 and 101 respectively, which receive the short pins 102 and 103 mounted on the underside of the partial bottom wall 77 to aid in locking the magazine C on the receiver plate 90 against the wall 18 of the casing 16.

The magazine C is initially attached to the casing by a pair of spaced pins 104 extending upwardly from the partial top wall 76 which are first positioned in the spaced holes 105 formed in the upper wall 92 of the magazine receiver plate 90 by holding the magazine C substantially at the angle illustrated in FIGURE 8. The magazine is then brought against the casing to engage the pins 102 and 103 with the spring tongues 98 and 99 which direct the pins into the holes 100 and 101 respectively thereof. As a result the magazine is securely and removably locked to casing 16, with the cover 78 in an open or closed position. With the magazine C attached to the end of the casing 16, the aperture 75' of the magazine wall 75 is in alignment with the aperture 96 of the receiver plate 90 and the aperture 97 of the casing end wall 18 for receiving the strip print paper hereinafter referred to.

The magazine C also includes the idler shaft 105' the rear end of which is rotatably mounted on the wall portion 70 of the stationary rear side wall 71 by means of the pair of bearings 106. Further provided are a pair of spaced paper guide rollers 107 and 108 adjustably mounted on the shaft 105. The rollers 107 and 108 are each formed with the annular paper supporting hub 109 and the annular shoulder 110. The space between the paper guide rollers 107 and 108 is determined by the width of the printing paper used on the spool 63. The numeral 111 designates a disc secured on the shaft 105 substantially centrally of the guide rollers 107 and 108, the purpose of which is to aid in supporting the print paper.

I further provide within the magazine C the light lock housing 112 which includues the substantially horizontal bottom portion 113 which has the elongated paper aperture 114 formed therein. The housing 112 further includes the outer front wall 115 having an upright flat portion 116 terminating in an arcuate portion 117 which terminates in a further flat upright portion 118 terminating in a second arcuate portion 119 which terminates in the horizontal top portion 120. Extending from the top portion 120 of the housing 112 is the pair of lugs 121 and 122 which receive the mounting screws 123 and 124 extending from the wall 75 to thereby support the housing 112 on the wall 75.

Figure 15:
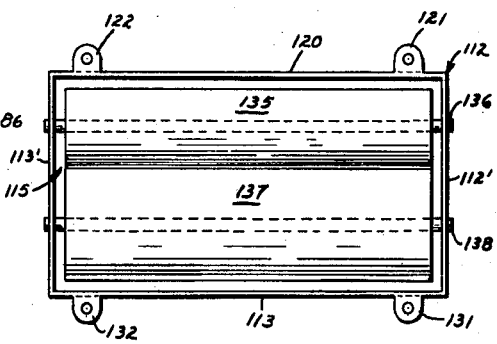
FIGURE 15 is a front elevational view of the light lock of the paper supply and take-up magazines.

Further provided within the magazine C is the paper guide 125, particularly FIGURES 9 and 15, positioned below the light lock 112 which is formed on the arcuate base portion 126 terminating in the upwardly and angularly extending flat portion 127, the upper edge of the portion 127 being positioned adjacent the aperture 114 of the housing 112. The base portion 126 is formed with the lip portion 128 which is secured under the lip 129 formed on the outer edge of the bottom wall 77. The upstanding flat portion 127 of the guide 125 is further supported by the bracket 130 secured thereto and to lugs 131 and 132 formed on the lower edge of the housing 112 by means of the bolts 133 and 134 extending through the lugs 131 and 132 from the wall 75 thereby further supporting the housing 112 in conjunction with the screws 123 and 124.

I further provide within the light lock housing 112 the upper roller 135 rotatably mounted on the shaft 136 secured to the ends 112' and 113' of the housing 112. Also provided is the lower roller 137 rotatably mounted on the shaft 138 which is below and slightly offset from the shaft 136 and the upper periphery of the lower roller 137 is substantially in line with or slightly higher than the lower periphery of the upper roller 135. The inside of the housing 112 is blackened and this together with the roller provides a light lock for the magazine C. The continuous strip print paper indicated as X and mounted on the spool 63 is pulled off the spool, passed under the guide rollers 107 and 108, extended upwardly in front of the guide 125 and upwardly through the aperture 114 of the light lock 112, thence between the rollers 135 and 137, and out through the aperture 75'. The paper X may then be fed from the magazine through the apertures 96 and 97 of the plate 90 and the casing end wall 18 respectively and into the casing 16 where the paper is positioned on the paper advance roller 44 and thence downwardly to and under the feed roller 35 where it is directed to the table member generally designated as 139 which is mounted on the bottom 17 of the casing 16.

Referring back to the positioning of the strip print paper under the feed roller 35 for advancement thereby to the table member 139, the print paper is held in alignment and proper position for exposure by means of the secondary table or paper mask and support 250 formed with the aperture 251 in the top 252 thereof and over which the paper is positioned. A plate 253 is positioned upon the paper upon the paper support 250 and maintained in position by the stops 254. An alarm device designated generally as 255 is mounted on the arm 256 overlying the path of the print paper, the arm 256 being pivotally mounted on the rod member 257 connected to the plate 258 which is secured to the rear casing wall 20. The arm 259 of the alarm 255 is responsive to a splice hole formed in the paper and through electrical circuit means not shown, the audible signal is given so that the operator will not print in the spliced area.

The print paper moves from the paper support 250 to and under a pair of rollers 260 and 261 mounted on the carriage 262 which is slidably and adjustably positioned on the table member 139. The carriage 262 mounts a paper slitting device and a paper numbering device.

The print paper strip is passed upwardly from the rollers 260 and 261 and over a cushion or take-up roller 263 freely rotatable on the shaft 264 secured to the end 265 of the arm 266. The opposite end 267 of the arm 266 is pivotally connected to the rear casing wall 20 and the arm is urged upwardly by means of the coil spring 268 secured to the arm 266 and the support 269. The upward movement of the arm 266 is limited by the stop 270 secured to the rear wall 20 and the downward movement is limited by the stop 271 also secured to the rear wall 20. Secured to the inner surface of the end wall 19 is the light lock housing 112" identical to that mounted in the magazine C but in reversed position, FIGURE 2. The numeral 272, FIGURE 30, designates a magazine receiver plate secured to the casing end wall 19 and which is substantially the same as the receiver plate 90 hereinbefore described and which receives the magazine D which is the same construction as a magazine C and may be used interchangeably therewith.

The receiver plate 272 includes the flat base portion 273, the peripheral upper, lower and side walls 274, 275 and 276 respectively. The plate portion is formed with the paper receiving aperture 277 which is in alignment with a similar aperture formed in the end wall 19. The upper wall 274 of the magazine receiver plate 272 is formed with the pair of spaced holes 278 which receive the pins 102 and 103, FIGURES 13 and 2, of the magazine D which is identical to magazine C only in reversed top to bottom position. In other words, where the pins 102 and 103 of the magazine C are in a lower position and engage the spring tongues 98 and 99 as in FIGURE 2 and FIGURE 12, in the case of magazine D the pins 102 and 103 thereof are in an upward position and engage the pair of holes 278 in the upper wall 274 of the magazine receiver plate 272 as will be seen in FIGURES 2 and 30. Further, in the case of the magazine D, the pins 104 are in a lower position and engage the holes 279 and 280 of the spring tongues 281 and 282 respectively to thereby mount the magazine D on the casing 16 in substantially the manner in which the magazine C is mounted on the casing 16 as hereinbefore described.

As pointed out the magazine D is a duplicate of magazine C and includes the light lock housing 112″ which is identical with the housing 112 including the upper roller 135 and the lower roller 137 between which the paper X is positioned. The paper X is further fed upwardly and around the guide rollers 107 and 108 to the spool 63, which in the case of the magazine D is the take-up spool.

When the magazine D is secured to the end of the casing as set out above, the pulley 57 automatically engages the belt 283 which is mounted on the idler pulley 284 on the lower shaft 285 journaled in the boss 286 formed on the support wall 10 and the driven pulley 287 mounted on the upper shaft 288 journaled in the boss 289 formed on the support wall 10 directly above the boss 286. Mounted on the outer or rear end of the shaft 288 is the slip clutch unit 290 including the pulley 291 on which the belt 292 is positioned. The belt 292 is also positioned around the pulley 293, FIGURE 3, which has secured thereto the drive gear 294 mounted on the shaft 295 of the gear reduction unit 296 driven by the motor 297. The motor 297 is mounted on the support frame 298 secured to the wall support 10 by means of the bolts 299 and operated by a conventional switch and a source of electrical power not shown.

Positioned on the drive gear 294 is the chain 300 which is also positioned on the take-up idler gear 301 mounted on the arm 302 adjustably mounted on the support wall 10. The chain 300 is also positioned on the sprocket 160 of the drive assembly B hereinbefore described, the chain passing downwardly through the opening 303 formed in the upper wall 145 of the housing 144.

Figure 2:
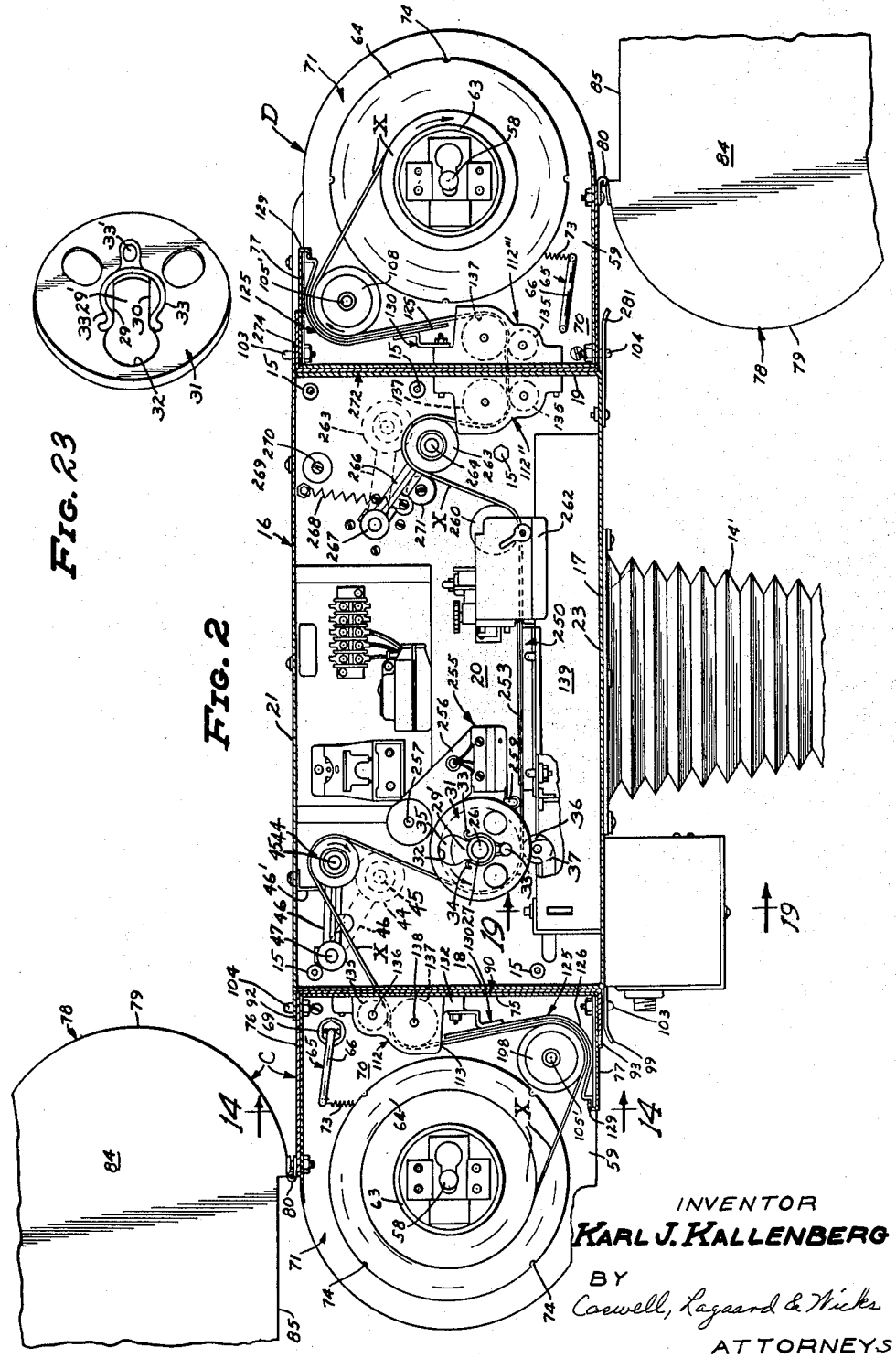
FIGURE 2 is a front elevational view of the upper deck casing with the cover door removed and the paper roll magazines in open positions.
Figure 3:
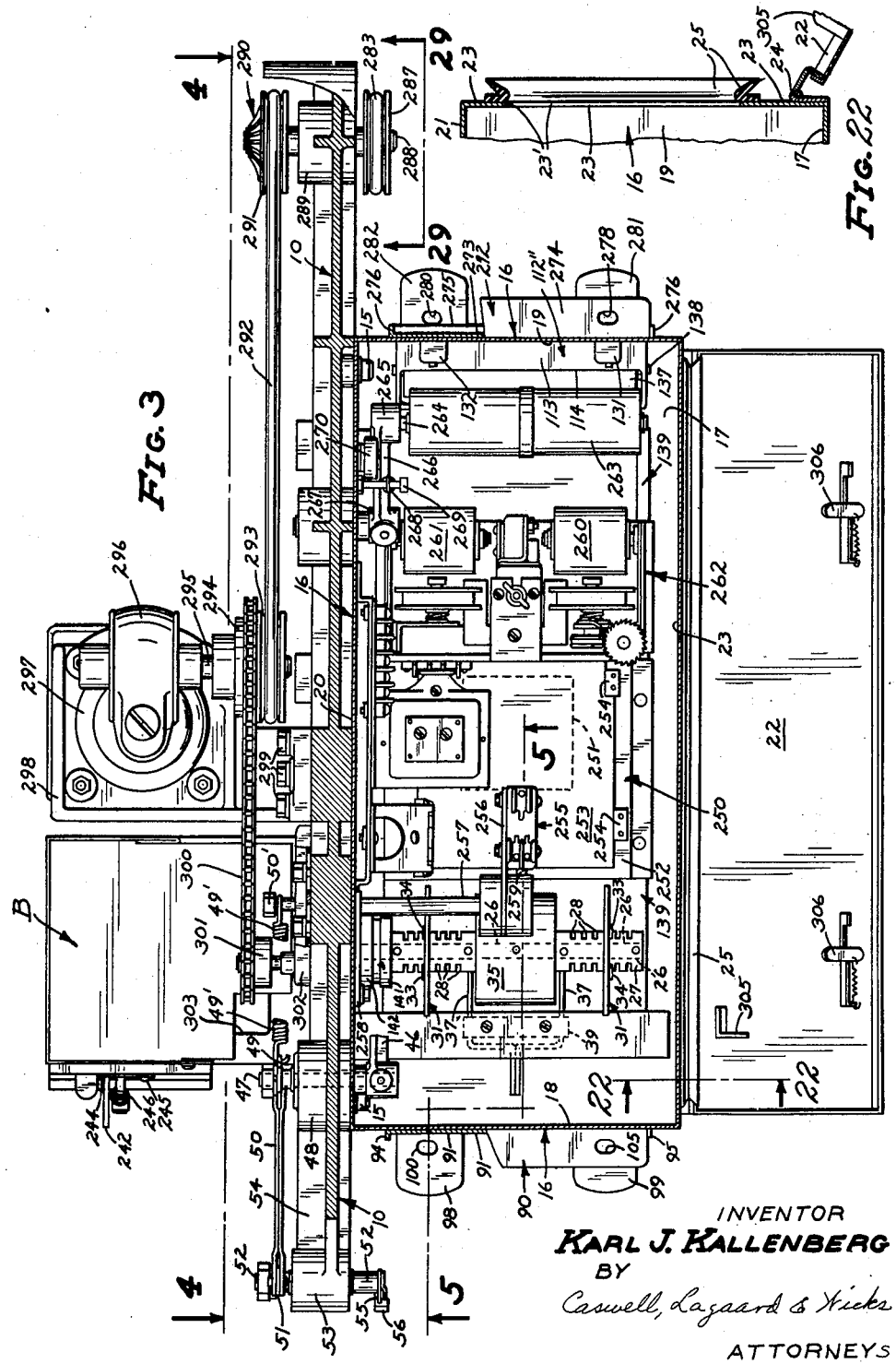
FIGURE 3 is a top plan view of the upper deck unit some parts in section, other parts removed and the cover door for the casing in lowered open position.

With regard to the operation of my device and looking particularly at FIGURE 2 wherein the print paper X is threaded in operative position, the paper X receives an exposure from a light source from electrical timing means located beneath the base 13 which passes through a negative positioned on the frame 13′, the objective lens positioned within the lens deck housing 14 secured to the lower end of the bellows 14′ and thence to the aperture 251.

After the termination of the above exposure, the paper feed roller 35 is rotated by means of the drive assembly hereinbefore described through electrical timing means. As the roller 35 is rotated in a counterclockwise direction the paper X is advanced between said roller and the pressure roller 36 to the paper mask and 252, and as the roller 35 rotates, the paper draw-up roller 44 is pulled downwardly about the pin 47 substantially to the broken line position of FIGURE 2 against the action of the spring 49′. The rotation of the pin 47 removes the brake shoe 56 from the edge of the pulley 57 of the magazine C through the linkage hereinbefore described thereby allowing the paper supply spool 63 to be rotated. When the feed roller 35 is stopped, the draw-up roller 44 is drawn upwardly by the spring 49′ and in so doing draws a length of paper X off the spool 63. As the roller 44 assumes its substantially upward position, FIGURES 2 and 5, the brake shoe 56 engages the pulley 57 thereby braking the spool 63. The length of paper is drawn off, as above, so that when the feed roller 35 is again rotated to advance the paper X, the mass of the roll of paper and the spool does not have to be overcome, but rather the feeding of paper by the roller is directly from the length of paper which was drawn off the spool by the return of the draw-up roller 44.

With further regard to the action of the machine, the paper X extends under the pair of rollers 260 and 261 and upwardly to and over the take-up roller 263, then downwardly into the light lock housing 112″ where the paper is passed between the rollers 135 and 137 thereof. The paper further extends through the apertures formed in the casing and wall 19 and the end of the magazine D, thence between the rollers 135 and 137 of the light lock housing 112″ from which the paper is passed over the paper guide rollers 107 and 108 in the magazine D and upon the take-up spool 63 therein.

When the magazine D is in the position of FIGURE 2 the pulley 57 thereof is urged to rotate due to the fact that it engages the belt 283 driven by the slip clutch 290 through the pulley 287 both of which are mounted on the shaft 288, FIGURES 3, 4, 17 and 29. It is to be noted that the driving force of the slip clutch 290 creates a pull on the paper X and as a result the take-up roller 263 is pulled into the downward position of FIGURE 2.

As the paper is advanced from the drive roller 35, the roller 263 begins to draw the paper upwardly because the mass to overcome of the roller 263 is less than the turning movement urged on the take-up spool 63 by the slip clutch 290. As the paper is begun to be drawn upwardly by the cushion or take-up roller 263, the spool 63 begins to rotate to wind paper on the same. As the advance of the paper is stopped by the roller 35, the take-up spool 63 continues to rotate and wind paper thereon, and as this winding occurs the roller 263 is drawn downwardly by the pull of the paper X against the action of the spring 268, thereby providing a cushion for the paper take-up on the take-up spool 63 with the resultant effect that there is substantially no chance for movement of paper at the paper support mask 250. Further, an additional benefit of the action of the cushion roller 263 is to keep the paper under slight tension and aid in correct tracking through the mechanism.

The electrical power to the casing 16 is provided through the interlock switch 304 mounted on the inside of the casing, the points of which are held in closed position by means of the lug 305 mounted on the inside of the door 22 when the door is in closed light-sealing position, FIGURE 28. The switch contacts are opened when the door 22 is opened thereby cutting off power to the casing as a safety factor. The cover is maintained in closed position by means of the lock members 306 which engage a portion of the casing.

It is to be noted that when both of the magazines C and D are attached to the casing 16, the entire unit is light proof, and when the take-up spool 63 is full with exposed paper, the magazine D may be removed from the casing for further processing, for the magazine is impervious to light. This is particularly desirable when color prints are made for light must be excluded. With the magazine D removed light cannot enter the casing 16.

Figure 20:
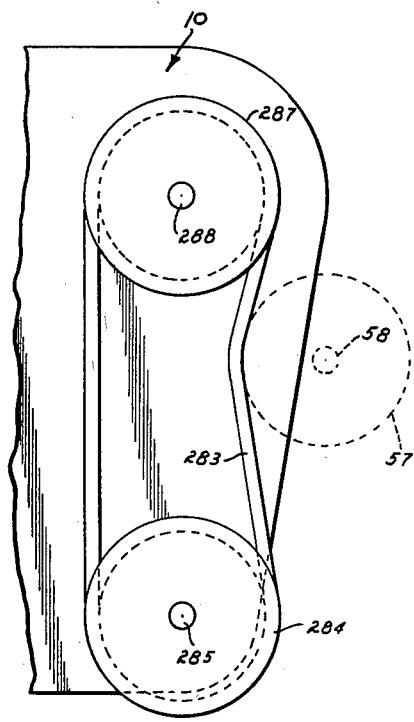
FIGURE 20 is a fragmentary elevational view on the line 20—20 of FIGURE 5 with the driven pulley of the take-up roll shown in broken lines.
Figure 14:
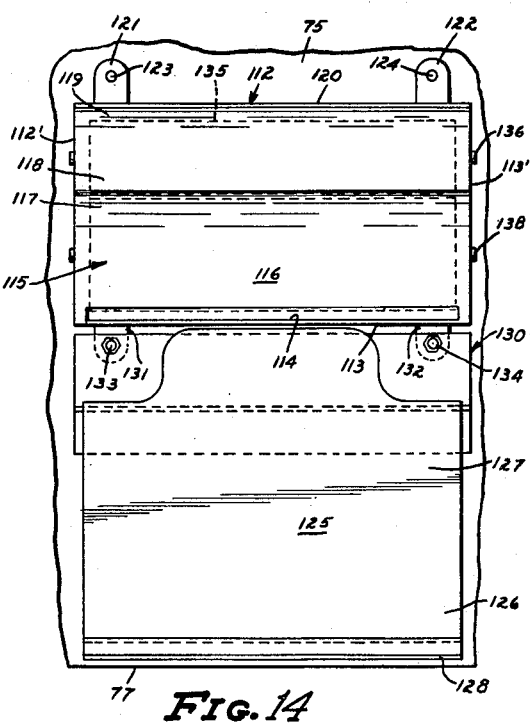
FIGURE 14 is a view substantially on the line 14—14 of FIGURE 2 with the supply spool lock arm and paper guide rollers removed, the end wall of the casing only partially shown.

As can be seen from FIGURE 20, the timer 307 utilized for determining the exposure period can be employed for providing a pulse to energize the solenoid which is held in by the hold-in relay 308 at the end of the exposure period.

The invention is not to be understood as restricted to the details set forth since these may be modified within the scope of the appended claims without departing from the spirit and scope of the invention.

Having thus described the invention, what is claimed as new and desired to be secured by Letters Patent is:

1. A photographic printer machine comprising, in combination, a casing, brake shoe means mounted on one end of said casing having means for actuating said brake shoe means, driving means mounted on the outer end of said casing, a magazine having a spool for print paper rotatably mounted therein, a pulley mounted on the outside of said magazine and connected to said spool, means for mounting said magazine on either end of said casing, said pulley engageable by said brake shoe means for braking said spool when mounted on one end of said casing and engageable with said driving means for rotating said spool when mounted on the other end of said casing.

2. In a magazine for containing a supply of strip material for use with the casing of a photographic printer machine, a hollow body member, a shaft mounted in said body member adapted to mount a roll of strip material, cover means for allowing access to the interior of said body member, a portion of said shaft being extended from said casing body, said extended shaft portion having a pulley mounted thereon for braking and for driving said shaft by means on the casing of a printer machine, means for removably connecting said body member to a casing of a photographic printer machine, a disk member secured to said shaft, and lever means pivotally mounted on said body member normally biased to engage said disk member to arrest rotation thereof when the magazine body member is not connected to the casing of a printer machine and to disengage said disk member when the magazine body member is connected to the casing of a printer machine.

3. In a magazine for containing a supply of strip material for use with the casing of a photographic printer machine, a hollow body member, a shaft mounted to said body member adapted to mount a roll of strip material, a portion of said shaft being extended from said casing body, said extended shaft portion having a pulley mounted thereon for braking and for driving said shaft by means on the casing of a photographic printer, means for removably connecting said body member to a casing of a photographic printer machine, a disk member secured to said shaft, and lever means pivotally mounted on said body member normally biased to engage said disk member to arrest rotation of said shaft when the magazine body member is not connected to a casing of a printer machine and allow rotation of said disk member and shaft when said magazine body member is connected to a casing of a printer machine.

4. A photographic printer machine comprising in combination, a casing, brake means mounted on one end of said casing, means for actuating said braking means, driving means mounted on the other end of said casing, a magazine having a shaft rotatably mounted therein and adapted to mount a roll of print paper, a portion of said shaft extended from said magazine and having a pulley mounted thereon, means for mounting said magazine on either end of said casing, said pulley engageable by said brake means for braking said shaft when said magazine is mounted on one end of said casing, said pulley engageable with said driving means for rotating said shaft when said magazine is mounted on the other end of said casing.

References Cited by the Examiner
UNITED STATES PATENTS

| | | | |
|---|---|---|---|
| 872,970 | 12/07 | Pink | 242—71.1 |
| 2,188,377 | 1/40 | Small | 242—55.13 |
| 2,499,895 | 3/50 | Walker | 242—55.13 X |
| 2,778,880 | 1/57 | Eash | 242—55.13 X |
| 2,879,341 | 3/59 | Kucher | 242—55.13 X |

MERVIN STEIN, *Primary Examiner.*